(12) United States Patent
Krohmer et al.

(10) Patent No.: US 6,668,696 B1
(45) Date of Patent: Dec. 30, 2003

(54) TABLE SAW OUTFEED TABLE

(75) Inventors: Steven D. Krohmer, Coon Rapids, MN (US); James J. Frey, Edina, MN (US)

(73) Assignee: Rockler Companies, Inc., Medina, MN (US)

( * ) Notice: Subject to any disclaimer, the term of this patent is extended or adjusted under 35 U.S.C. 154(b) by 158 days.

(21) Appl. No.: 09/696,851

(22) Filed: Oct. 26, 2000

(51) Int. Cl.⁷ .................................................. B25H 1/02
(52) U.S. Cl. ..................... 83/477.2; 144/286.1; 144/287
(58) Field of Search ........................... 83/477.2, 441.1; 144/286.1, 286.5, 287; 108/105, 75, 71, 48, 64, 65, 97, 152; 248/220.22, 223.41, 244, 298.1, 295.1

(56) References Cited

U.S. PATENT DOCUMENTS

| | | | | |
|---|---|---|---|---|
| 1,658,826 A | * | 2/1928 | Yerk et al. | 144/286.1 |
| 1,864,840 A | * | 6/1932 | Lehner | 144/287 |
| 2,555,217 A | * | 5/1951 | Young | 144/286.1 |
| 2,986,627 A | * | 5/1961 | Marriett | 248/298.1 |
| 3,236,487 A | * | 2/1966 | Chakeres | 248/244 |
| 3,741,131 A | * | 6/1973 | Leadbetter | 108/97 |
| 4,068,551 A | * | 1/1978 | Kreitz | 144/286.1 |
| 4,106,381 A | * | 8/1978 | Kreitz | 83/477.2 |
| 4,406,200 A | * | 9/1983 | Kerr | 83/477.2 |
| 4,410,023 A | * | 10/1983 | Vasquez | 144/287 |
| 4,640,326 A | * | 2/1987 | Hewitt | 144/286.1 |
| 4,665,888 A | * | 5/1987 | Christen, Jr. et al. | 108/97 |
| 4,869,180 A | * | 9/1989 | Boswell | 108/157.1 |
| 4,934,423 A | * | 6/1990 | Withrow | 83/477.2 |
| 4,949,929 A | * | 8/1990 | Kesselman et al. | 248/244 |
| 5,048,784 A | * | 9/1991 | Schwartz et al. | 248/244 |
| 5,056,572 A | * | 10/1991 | Del Vacchio | 144/286.1 |
| 5,104,080 A | * | 4/1992 | Berger | 108/152 |
| 5,105,698 A | * | 4/1992 | Dunham | 83/477.2 |
| 5,201,863 A | * | 4/1993 | Peot | 83/477.2 |
| 5,261,304 A | * | 11/1993 | Stollenwerk et al. | 144/287 |
| 5,265,396 A | * | 11/1993 | Amimoto | 52/745.12 |
| 5,317,977 A | * | 6/1994 | Omessi | 108/97 |
| 5,379,815 A | * | 1/1995 | Brazell et al. | 144/287 |
| 5,379,816 A | * | 1/1995 | Charlton | 144/287 |
| 5,697,411 A | * | 12/1997 | Vandaele | 144/287 |
| 5,979,523 A | * | 11/1999 | Puzio et al. | 83/477.2 |
| 6,112,785 A | * | 9/2000 | Yu | 144/287 |
| 6,401,579 B2 | * | 6/2002 | Lei | 144/287 |

OTHER PUBLICATIONS

Rockler Table saw Outfeed Table Assembly Instructions–Printed on January 9, 2003 from Internet.*
Rockler Woodworking and Hardware Fall 2000 catalog, pp. and 74.

* cited by examiner

*Primary Examiner*—Stephen Choi
(74) *Attorney, Agent, or Firm*—Gerald E. Helget; Nelson R. Capes; Briggs and Morgan

(57) ABSTRACT

An outfeed table for a table saw for cutting a workpiece. The outfeed table attaches to the tabletop of the saw table and provides support for the workpiece as the workpiece is cut and moves off the saw table. The outfeed table consists of a support surface or tabletop for supporting the workpiece. Optionally, a miter slot is cut into the tabletop to receive a miter bar from the table saw tabletop. An adjustable bracket is attached to the support surface or tabletop at one end and to the tabletop of the saw table at the other end, for adjusting both the horizontal spacing of the outfeed table from the table saw and the height of the outfeed table relative to the table saw.

8 Claims, 3 Drawing Sheets

TABLE SAW OUTFEED TABLE

BACKGROUND OF THE INVENTION

The present invention relates to an outfeed table for a table saw. Table saws are mounted on tables and the workpiece is cut as it is slid along the tabletop of the saw table.

A long workpiece requires support as it exits the tabletop of the saw table, or else it might break or bend.

There is a need for an outfeed table attachable to a table saw to support the workpiece as the workpiece exits the table saw.

SUMMARY OF THE INVENTION

An outfeed table for a table saw for cutting a workpiece, the table saw having a tabletop supporting the workpiece for cutting, the outfeed table adapted to attach to the tabletop of the table saw and provide support for the workpiece as the workpiece is cut and moves off the table saw tabletop, the outfeed table comprising:

a) a support surface adapted to support the workpiece, wherein the support surface has at least one miter slot adapted to receive a miter bar from the table saw tabletop; and
 b) an adjustable bracket attached to the support surface and adapted to be attached to the tabletop of the table saw, wherein the adjustable bracket further comprises a first L-bracket having a first base and a first slot therethrough, and a second L-bracket having a second base and a second slot therethrough, the first base slidingly engaging the second base, and a first connector engaging the first slot and the second slot for horizontal adjustment, wherein the second L-bracket has a third slot therethrough and a second connector engaging the third slot and adapted to engage the table saw tabletop for vertical adjustment.

DETAILED DESCRIPTION OF PREFERRED EMBODIMENT

Figure 4:
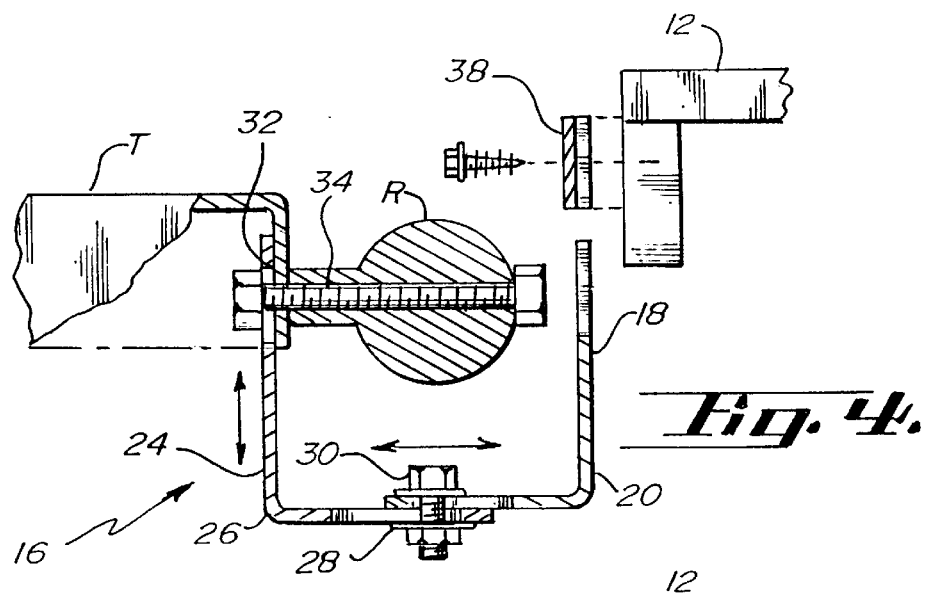
FIG. 4 is a detailed schematic of the bracket that attaches the outfeed table to the table saw.

The outfeed table of the present invention is generally shown in the Figures as reference numeral 10.

Figure 1:
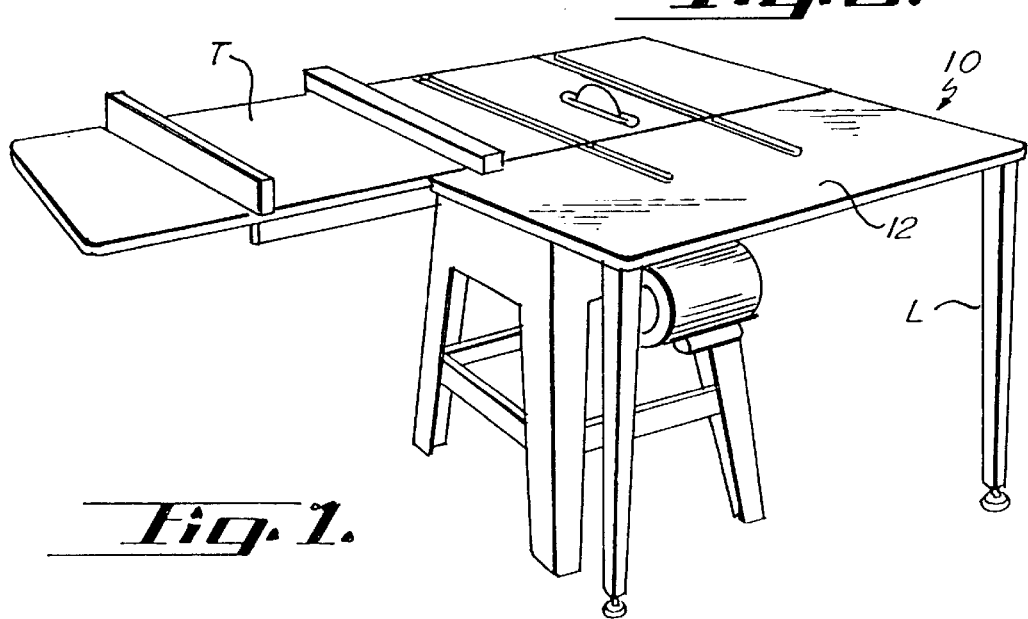
FIG. 1 is a perspective view of the outfeed table of the present invention, showing the table saw in phantom.
Figure 2A:
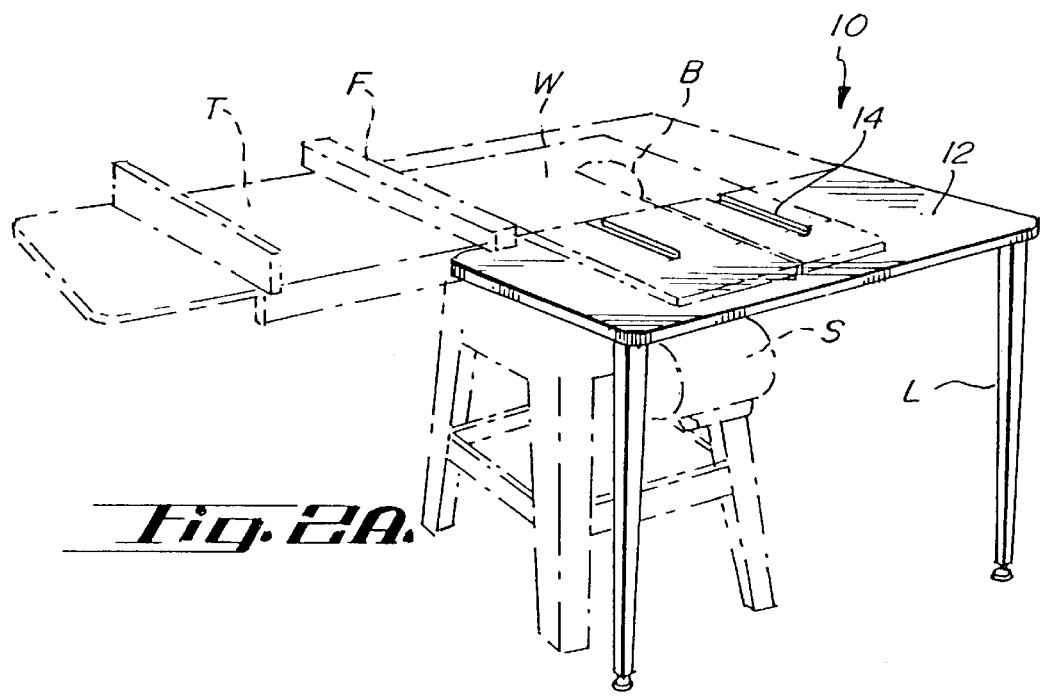
FIG. 2A is the same as FIG. 1, but shows a workpiece being cut lengthwise.
Figure 2B:
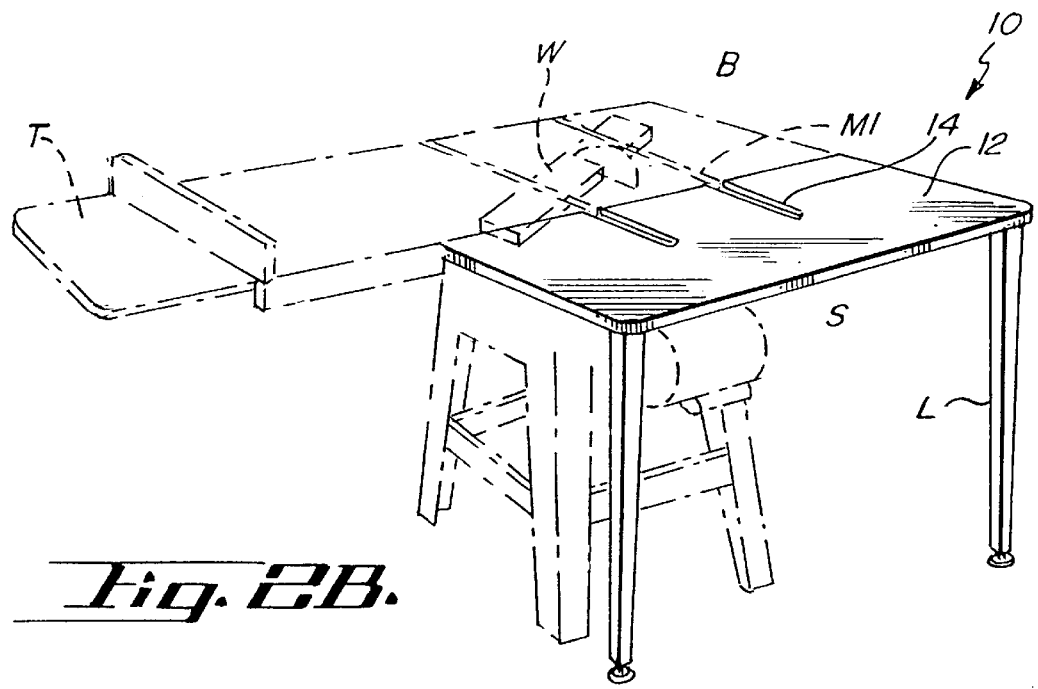
FIG. 2B is the same as FIG. 2A, but shows a workpiece being cut cross-wise.

FIGS. 1, 2A, and 2B show the outfeed table 10 attached to a table saw S. The table saw S has a tabletop T upon which the workpiece W rests for cutting. In FIG. 2A, the workpiece is being cut lengthwise. The workpiece W rests up against a fence F for cutting, with the placement of the cut in the workpiece being adjustable by moving the fence toward or away from the saw blade B.

As best seen in FIG. 2A, the cut portion of the workpiece W extends from the table saw out over the outfeed table 10, and the outfeed table 10 supports the cut workpiece.

Figure 2C:
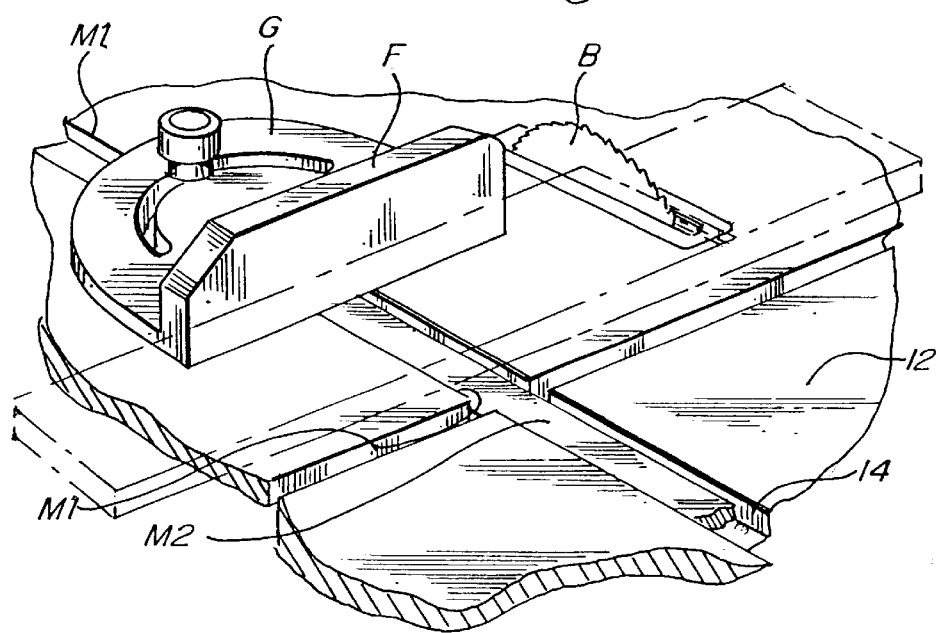
FIG. 2C is a detailed view of the miter slots of the table saw and the outfeed table, showing the miter bar being received in the miter slot of the outfeed table.

In FIGS. 2B and 2C, the workpiece is being cut cross-wise. The workpiece may rest on a miter gauge G in order to cut the workpiece at an angle. The table saw has miter slots M1 in the tabletop T for receiving miter bars M2 as is well-known in the art. The miter gauge is connected to miter bars M2. The outfeed table has miter slots 14 in the support surface 12 into which the miter bars M2 move as the workpiece is moved across the saw blade B.

Figure 3:
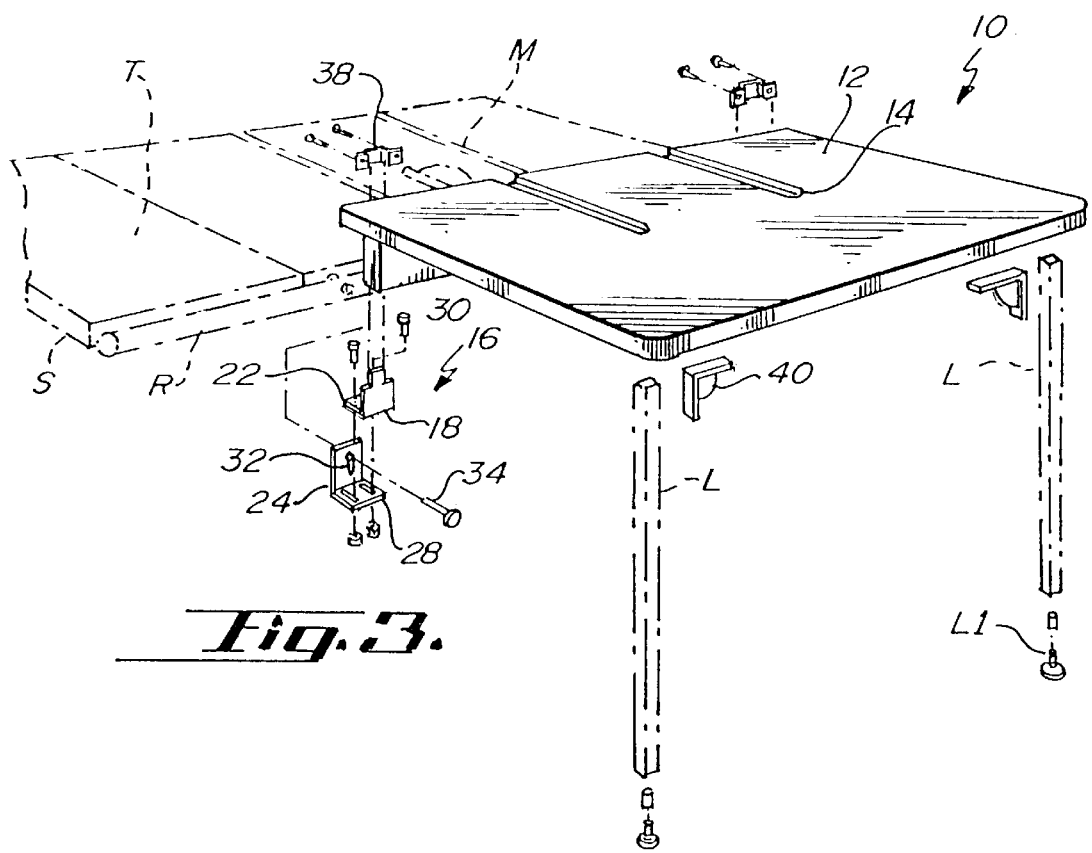
FIG. 3 is an exploded perspective view of the outfeed table of the present invention.

FIG. 3 shows an exploded view of the outfeed table 10. The outfeed table 10 has a support surface or tabletop 12 adapted to support the cut workpiece W.

An adjustable bracket 16 is attached to the support surface or tabletop 12 and is adapted to be attached to the tabletop T of the table saw S.

As best seen in FIGS. 3 and 4, the adjustable bracket 16 further comprises a first L-bracket 18 having a first base 20 and a first slot 22 therethrough, and a second L-bracket 24 having a second base 26 and a second slot 28 therethrough. The first base 20 slidingly engages the second base 26 for horizontal adjustment of the support surface 12 relative to the tabletop T of the table saw, as indicated by the horizontal arrow. A first connector 30, such as a screw or bolt, engages the first slot 22 and second slot 28 for horizontal adjustment of the bracket 16. By tightening the first connector 30, the first base 20 and second base 26 will be held at the spacing set by the operator. This is important in order to allow the outfeed table 10 to be used with table saws having a rear fence rail R, as shown in FIG. 4.

The second L-bracket 24 further comprises a third slot 32 therethrough and a second connector 34, such as a screw or bolt, engaging the third slot 32 and adapted to engage the table saw tabletop T for vertical adjustment, as shown by the second arrow in FIG. 4. By tightening the second connector 34, the linked L-brackets 18, 24 will be held at the spacing from the bottom of the tabletop T set by the operator. This allows the operator to set the support surface 12 of the outfeed table 10 at the same height as the tabletop T of the table saw.

A mounting plate 38 connects the first L-bracket 18 to the support surface 12. The mounting plate 38 is configured, as can be seen in FIG. 3, so as to slide over the first L-bracket 18 in order to quickly connect and disconnect the table 10 to the saw table T. The mounting plate 38 also has slots (not shown) for adjusting the mounting plate 38 vertically on the outfeed table 10.

The outfeed table 10 further comprises a plurality of folding leg brackets 40 attached to the support surface 12 for the attachment of legs L.

To set up the outfeed table 10, the operator assembles the two L-brackets 18, 24 as shown in FIG. 4 using the first connector 30. The second L-bracket 24 is then bolted to the tabletop T. If the tabletop T has a fence back rail R, the same bolts that hold the fence rail R to the tabletop T may be used. If not, the operator drills holes in the tabletop T and inserts nuts and bolts through the third slot 32.

The operator then moves the outfeed table 10 so as to align the miter slot 14 with the miter slot M1 of the table saw table. In this way, a miter bar (M2) may extend from the miter slot M1 to the miter slot 14. A fence F may then be attached to the miter bar, so that as the workpiece is cut and moves onto the outfeed table, it is kept aligned for cutting.

The mounting plate 38 is then attached to the tabletop 12 and adjusted for height as necessary, using slots in the mounting plate 38. The mounting plate 38 then slides over the first L-bracket 18 for quickly connecting the table 10 to the saw table T.

The operator then attaches legs to the support surface or tabletop 12 using folding leg brackets 40. The legs L may have height-adjustments L1. When the height of the outfeed table matches the height of the saw table T, the second connector 34 is tightened. The horizontal distance of the outfeed table 10 from the tabletop T of the saw table is set by sliding the L-brackets 18, 24, then tightening the first connector 30.

Figure 5:
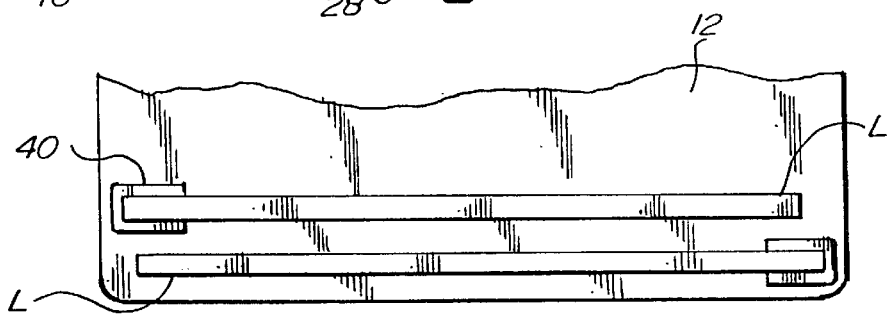
FIG. 5 is a partial bottom plan view of the tabletop of the outfeed table, with legs attached and folded.

The folding leg brackets 40 allow the legs L to be folded under the table 10 after removing the table 10 from the saw table T, as shown in FIG. 5.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. The outfeed table for a table saw for cutting a workpiece, the table saw having a tabletop supporting the workpiece for cutting, the outfeed table adapted to attach to the tabletop of the table saw and provide support for the workpiece as the workpiece is cut and moves off the table saw tabletop, the outfeed table comprising:

(a) a support surface adapted tos upport the workpiece; and (b) an adjustable bracket attached to the support surface and adapted to be attached to the tabletop of the table saw, wherein the adjustable bracket further comprises a first L-bracket having a first base and a first slot therethrough, and a second L-bracket having a second base and a second slot therethrough, the first base slidingly engaging the second base, and a first connector engaging the first slot and the second slot for horizontal adjustment.

2. The outfeed table of claim 1, wherein the support surface has at least one miter slot adapted to receive a miter bar from the table saw tabletop.

3. The outfeed table of claim 1, further comprising a plurality of folding leg brackets attached to the support surface.

4. The outfeed table of claim 1, further comprising a mounting plate slidably engaging the first L-bracket and attached to the support surface.

5. The outfeed table of claim 1, wherein the second L-bracket has a third slot therethrough and a second connector engaging the third slot and adapted to engage the table saw tabletop for vertical adjustment.

6. An outfeed table for a table saw for cutting a workpiece, the table saw having a tabletop supporting the workpiece for cutting, the outfeed table adapted to attach to the tabletop of the table saw and provide support for the workpiece as the workpiece is cut and moves off the table saw tabletop, the outfeed table comprising:

(a) a support surface adapted to support the workpiece, wherein the support surfact has a least one miter slot adapted to receive a miter bar from the table saw tabletop; and (b) an adjustable bracket attached to the support surface and adapted to be attached to the tabletop of the table saw, wherein the adjustable bracket further comprises a first L-bracket having a first base and a first slot therethrough, and a second L-bracket having a second base and a second slot therethrough, the first base slidingly engaging the second base, and a first connector engaging the first slot and the second slot for horizontal adjustment, wherein the second L-bracket has a third slot therethrough and a second connector engaging the third slot and adapted to engage the table saw tabletop for vertical adjustment.

7. The outfeed table of claim 6, further comprising a plurality of folding leg brackets attached to the support surface.

8. The outfeed table of claim 6, further comprising a mounting plate slidably engaging the first L-bracket and attached to the support surface.

* * * * *